(12) United States Patent
Yamakado et al.

(10) Patent No.: US 10,369,996 B2
(45) Date of Patent: Aug. 6, 2019

(54) TRAVEL CONTROL DEVICE AND TRAVEL CONTROL METHOD

(71) Applicant: ISUZU MOTORS LIMITED, Tokyo (JP)

(72) Inventors: Ryuu Yamakado, Fujisawa (JP); Shinichi Ishiguro, Kawasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 1 day.

(21) Appl. No.: 15/561,816

(22) PCT Filed: Mar. 18, 2016

(86) PCT No.: PCT/JP2016/058632
§ 371 (c)(1),
(2) Date: Sep. 26, 2017

(87) PCT Pub. No.: WO2016/158478
PCT Pub. Date: Oct. 6, 2016

(65) Prior Publication Data
US 2018/0111615 A1    Apr. 26, 2018

(30) Foreign Application Priority Data

Mar. 27, 2015    (JP) .................................. 2015-065566

(51) Int. Cl.
*B60T 8/32*    (2006.01)
*B60W 30/14*    (2006.01)
(Continued)

(52) U.S. Cl.
CPC .......... *B60W 30/143* (2013.01); *B60W 30/14* (2013.01); *B60W 30/18072* (2013.01);
(Continued)

(58) Field of Classification Search
CPC ............... B60W 30/143; B60W 30/14; B60W 30/18072
See application file for complete search history.

(56) References Cited

U.S. PATENT DOCUMENTS

| 8,214,124 B2 | 7/2012 | Kumabe et al. |
| 8,229,613 B2 * | 7/2012 | Kato ........................ B60K 6/48 701/22 |

(Continued)

FOREIGN PATENT DOCUMENTS

| CN | 101318472 A | 12/2008 |
| JP | 2009-035067 A | 2/2009 |

(Continued)

OTHER PUBLICATIONS

International Search Report from International Application No. PCT/JP2016/058632 dated Jun. 7, 2016.

(Continued)

*Primary Examiner* — Adam M Alharbi
(74) *Attorney, Agent, or Firm* — Brundidge & Stanger, P.C.

(57) ABSTRACT

Provided is a travel control device by which it is possible to further improve fuel economy in a vehicle. A travel control device has the following: a weather information acquisition unit that acquires weather information indicating a weather state of a road on which a vehicle travels; an estimation value switching unit that sets in a modifiable manner an estimation value for travel resistance on the vehicle traveling on the road, according to the acquired weather information; a coasting travel estimation unit that estimates a change in speed of the vehicle on the road on the basis of the estimation value for the set travel resistance; and an automatic travel control unit that generates a travel schedule for the vehicle including driving travel and coasting travel on (Continued)

the basis of the estimated change in the vehicular speed, and causes the vehicle to travel according to the generated travel schedule.

7 Claims, 4 Drawing Sheets

(51) Int. Cl.
*B60W 40/068* (2012.01)
*B60W 40/105* (2012.01)
*B60W 30/18* (2012.01)
*B60W 40/076* (2012.01)
*B60W 40/10* (2012.01)

(52) U.S. Cl.
CPC ........ *B60W 40/068* (2013.01); *B60W 40/076* (2013.01); *B60W 40/105* (2013.01); *B60W 40/1005* (2013.01); *B60W 2510/30* (2013.01); *B60W 2550/12* (2013.01); *B60W 2550/142* (2013.01); *B60W 2720/103* (2013.01); *Y02T 10/52* (2013.01); *Y02T 10/76* (2013.01)

(56) References Cited

U.S. PATENT DOCUMENTS

| | | | |
|---|---|---|---|
| 9,121,719 B2 * | 9/2015 | Stankoulov | G01C 21/3469 |
| 9,208,622 B2 * | 12/2015 | Ishii | G07C 5/004 |
| 9,744,879 B2 * | 8/2017 | Drako | B60L 15/2045 |
| 9,771,054 B2 | 9/2017 | Otake et al. | |
| 2008/0300766 A1 | 12/2008 | Kumabe et al. | |
| 2016/0019792 A1 | 1/2016 | Kawamata et al. | |

FOREIGN PATENT DOCUMENTS

| | | |
|---|---|---|
| JP | 2012-131273 A | 7/2012 |
| JP | 2013-248998 A | 12/2013 |
| JP | 2015-051646 A | 3/2015 |
| WO | 2013/125538 A1 | 8/2013 |
| WO | 2013/191621 A1 | 12/2013 |

OTHER PUBLICATIONS

Extended European Search Report dated Mar. 2, 2018 for European Patent Application No. 16772361.8.

* cited by examiner

TRAVEL CONTROL DEVICE AND TRAVEL CONTROL METHOD

TECHNICAL FIELD

The present disclosure relates to a travel control device and a travel controlling method for controlling travel of a vehicle.

BACKGROUND ART

As a conventional technique relating to travel of a vehicle, a technique for reducing the burden of the driver while improving fuel economy is known (see, for example, PTL 1).

In the technique disclosed in PTL 1 (hereinafter referred to as "conventional technique"), a travel schedule including drive travel and coasting is generated based on an estimation value of a travel resistance coefficient of a vehicle. Here, the travel resistance coefficient is a parameter which indicates the intensity of a resistance force (travel resistance force) of air and the road surface against a travelling vehicle. In addition, the drive travel is normal travel of a vehicle with the wheels driven with a power generation source such as an engine. In the coasting, with operations such as disengagement of the clutch, a vehicle travels with the inertia force without driving the wheels. With this configuration, in the conventional technique, the vehicle is controlled to travel in accordance with the generated travel schedule.

By employing the coasting, the fuel economy of a vehicle is improved. Accordingly, the conventional technique can allow the driver to perform travel with good fuel economy and fewer operations.

CITATION LIST

Patent Literature

PTL 1
Japanese Patent Application Laid-Open No. 2012-131273

SUMMARY OF INVENTION

Technical Problem

However, even with the conventional technique, the effect of improvement in fuel economy is limited.

The reason for this is as follows. For example, a travel schedule is generated in which coasting is started at a position before the crest where the road changes from an upslope to a downslope, and the vehicle passes through the crest without change and advances to the downslope. In this case, however, when the actual travel resistance coefficient is higher than the travel resistance coefficient used for generating the travel schedule, there is a possibility that, with abrupt reduction in vehicle speed than assumed, the vehicle speed can be significantly reduced and the vehicle cannot pass through the crest by the coasting. In this case, automatically, or with the driver's operation, the coasting is switched to the drive travel at a position before the crest. When such deviation from the travel schedule frequently occurs, the effect of improvement in fuel economy is degraded due to reduction in time length of the coasting and the like.

An object of present disclosure is to provide a travel control device and a travel controlling method which can further improve the fuel economy of a vehicle.

Solution to Problem

A travel control device of the present disclosure includes: a weather condition information acquiring section that acquires weather condition information representing a weather condition of a road on which a vehicle travels; an estimation value switching section that variably sets an estimation value of a travel resistance force to be exerted on the vehicle traveling on the road in accordance with the acquired weather condition information; a coasting estimation section that estimates a variation of a vehicle speed of the vehicle on the road based on the set estimation value of the travel resistance force; and an automatic travel control section that generates a travel schedule of the vehicle including drive travel and coasting based on the estimated variation of the vehicle speed, and controls the vehicle to travel in accordance with the generated travel schedule.

A travel controlling method of the present disclosure includes: acquiring weather condition information representing a weather condition of a road on which a vehicle travels; variably setting an estimation value of a travel resistance force to be exerted on the vehicle traveling on the road in accordance with the acquired weather condition information; estimating a variation of a vehicle speed of the vehicle on the road based on the set estimation value of the travel resistance force; and generating a travel schedule of the vehicle including drive travel and coasting based on the estimated variation of the vehicle speed, and controlling the vehicle to travel in accordance with the generated travel schedule.

Advantageous Effects of Invention

With the present disclosure, the fuel economy of a vehicle can be further improved.

DESCRIPTION OF EMBODIMENTS

An embodiment of the present invention is described below in detail with reference to the accompanying drawings.

(Configuration of Vehicle)

First, a configuration of a vehicle including a travel control device according to the embodiment of the present disclosure is described.

Figure 1:
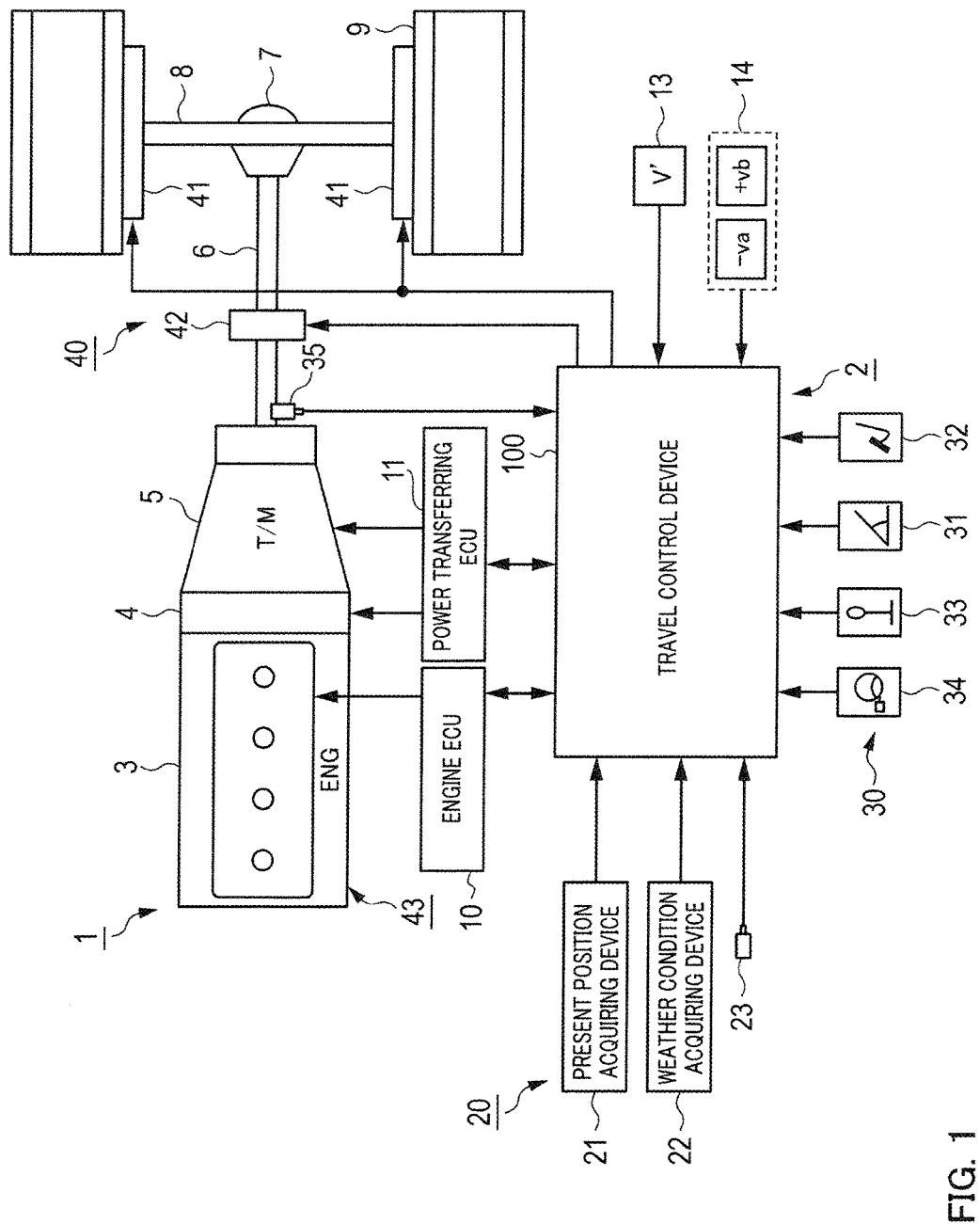
FIG. 1 is a block diagram illustrating an example of a configuration of a vehicle including a travel control device according to an embodiment of the present disclosure.

FIG. 1 is a block diagram illustrating an example of a configuration of the vehicle including the travel control device according to the present embodiment. It is to be noted that, here, portions related to the travel control device are illustrated and described.

For example, vehicle 1 illustrated in FIG. 1 is a large vehicle such as a truck in which an in-line six-cylinder diesel engine is mounted. It is to be noted that, in the following description, the coasting means coasting with the gear of transmission 5 in the neutral position.

As illustrated in FIG. 1, as a configuration of a driving system for travel of the vehicle, vehicle 1 includes engine 3, clutch 4, transmission 5, propeller shaft 6, differential gear 7, drive shaft 8, and wheel 9.

The power of engine 3 is transmitted to transmission 5 via clutch 4, and the power transmitted to transmission 5 is further transmitted to wheel 9 through propeller shaft 6, differential gear 7, and drive shaft 8. In this manner, the power of engine 3 is transmitted to wheel 9, and thus vehicle 1 travels.

In addition, as a configuration of a braking system for stopping the vehicle, vehicle 1 includes braking device 40. Braking device 40 includes foot brake 41 that applies a resistance force to wheel 9, retarder 42 that applies a resistance force to propeller shaft 6, and auxiliary brake 43 such as an exhaust brake that applies a load to the engine.

Further, as a configuration for controlling the travel of vehicle 1, vehicle 1 includes automatic traveling device 2. Automatic traveling device 2 controls the output of engine 3, the engagement and disengagement of clutch 4, and the transmission of transmission 5 for automatic travel of vehicle 1. Automatic traveling device 2 includes a plurality of control devices.

To be more specific, automatic traveling device 2 includes engine ECU (engine control unit) 10, power transferring ECU (power transferring control unit) 11, target-vehicle speed setting device 13, increment/reduction value setting device 14, road information acquiring device 20, vehicle information acquiring device 30, and travel control device 100. It is to be noted that, engine ECU 10, power transferring ECU 11, and travel control device 100 are connected with one another with an in-vehicle network, and required data and control signals are exchangeable therebetween.

Engine ECU 10 controls the output of engine 3. Power transferring ECU 11 controls the engagement and disengagement of clutch 4, and the transmission operation of transmission 5.

Target-vehicle speed setting device 13 sets target-vehicle speed V' of automatic travel of vehicle 1 in travel control device 100. Increment/reduction value setting device 14 sets speed reduction value −va and speed increment value +vb of automatic travel of vehicle 1 in travel control device 100. The values V', −va, and +vb are parameters used for automatic travel of vehicle 1.

For example, target-vehicle speed setting device 13 and increment/reduction value setting device 14 include an information input interface such as a display with a touch panel disposed at the dashboard of the driver's seat (which is not illustrated), and receive settings of the above-mentioned parameters from the driver. Target-vehicle speed V', speed reduction value −va, and speed increment value +vb are referred to as "setting information" as necessary.

Road information acquiring device 20 acquires road information representing the state of the road and the present position of vehicle 1, and outputs the information to travel control device 100. For example, road information acquiring device 20 includes present position acquiring device 21 that is a receiver of a global positioning system (GPS), weather condition acquiring device 22 that acquires the weather condition during travel, and periphery sensor 23 that detects the distance from other vehicles around the travelling vehicle such as a vehicle travelling ahead and/or a vehicle travelling on a side, and the difference in vehicle speed from other vehicles around the travelling vehicle.

Desirably, in view of generation of the travel schedule described later, the road information includes road grade information representing the grade at each point of the road. For example, the road grade information is data in which, in association with the horizontal position (latitude longitude information and the like) of each point of the road, the altitude (road altitude) of the corresponding position is described.

Vehicle information acquiring device 30 acquires vehicle information representing the state of vehicle 1 and details of the operation of the driver, and outputs the information to travel control device 100. For example, vehicle information acquiring device 30 includes accelerator sensor 31 that detects the pressing amount of the accelerator pedal, brake switch 32 that detects the presence/absence of the pressing of the brake pedal, shift lever 33, turn-signal switch 34, and vehicle speed sensor 35 that detects vehicle speed V of vehicle 1.

Desirably, in view of generation of the travel schedule described later, the vehicle information includes wiper information representing the operation state of the wiper (not illustrated) of vehicle 1, and vehicle weight information representing the present weight of vehicle 1.

On the basis of the setting information, the road information, and the vehicle information, travel control device 100 generates a travel schedule including drive travel and coasting. It should be noted that travel control device 100 uses a value which differs depending on whether it is raining as a travel resistance coefficient of the case where the vehicle performs coasting on the road, to estimate the variation of the vehicle speed of the vehicle on the road, and generate a travel schedule including coasting. Then, travel control device 100 controls each section of vehicle 1 such that vehicle 1 travels in accordance with the generated travel schedule.

Figure 2:
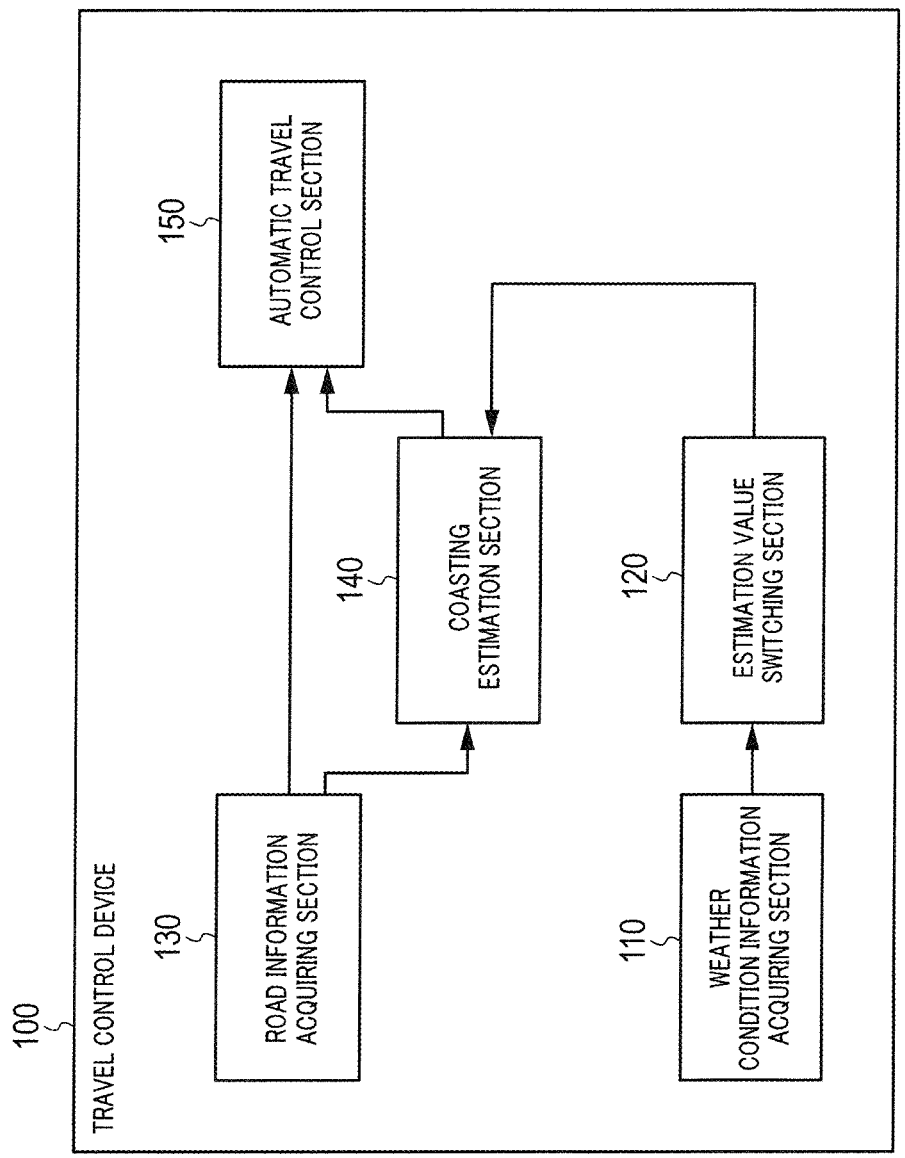
FIG. 2 is a block diagram illustrating an example of a configuration of the travel control device according to the present embodiment.

FIG. 2 is a block diagram illustrating an example of the configuration of travel control device 100.

In FIG. 2, travel control device 100 includes weather condition information acquiring section 110, estimation value switching section 120, road information acquiring section 130, coasting estimation section 140, and automatic travel control section 150.

Weather condition information acquiring section 110 acquires weather condition information representing the weather condition of the road, and outputs the acquired weather condition information to estimation value switching section 120.

In the present embodiment, the weather condition information indicates whether the road on which vehicle 1 travels is under a rainfall condition, and further, the weather condition information is the above-described wiper information. That is, in the present embodiment, the weather condition information indicates whether the road is under a rainfall condition on the assumption that the wiper is stopped in the case of a non-rainfall condition and is operated in the case of a rainfall condition.

In accordance with the output weather condition information, estimation value switching section 120 variably sets an estimation value of the travel resistance force which is exerted on vehicle 1 traveling on the road. To be more specific, when the road is under a non-rainfall condition, estimation value switching section 120 sets, to coasting estimation section 140, an estimation value of a travel resistance coefficient of the case where vehicle 1 travels the road under a non-rainfall condition. In addition, when the road is under a rainfall condition, estimation value switching section 120 sets, to coasting estimation section 140, an estimation value of a travel resistance coefficient of the case where vehicle 1 travels on the road under a rainfall condition.

Road information acquiring section 130 acquires road grade information representing the grade of the road. For example, road information acquiring section 130 acquires road grade information from the above-described road information. Then, road information acquiring section 130 outputs the acquired grade information to coasting estimation section 140 and automatic travel control section 150.

On the basis of the travel resistance coefficient set by estimation value switching section 120 and the road grade information output from road information acquiring section 130, coasting estimation section 140 estimates the variation of the vehicle speed of vehicle 1 on the road. That is, coasting estimation section 140 uses the plurality of the estimation values of the travel resistance coefficients in a switching manner in accordance with whether the road is under a rainfall condition, to estimate the variation of the vehicle speed. Then, coasting estimation section 140 outputs estimated vehicle speed information representing the estimated variation of the vehicle speed to automatic travel control section 150.

It is to be noted that, for example, the plurality of estimation values of the travel resistance coefficients may be stored in advance as travel resistance information by estimation value switching section 120 or coasting estimation section 140, or may be acquired as necessary through communications with external devices such as servers on the Internet. The estimation of the variation of the vehicle speed (hereinafter referred to as "vehicle speed estimation") and the travel resistance information are described in detail later.

On the basis of the road grade represented by the output road grade information and the estimated variation of the vehicle speed represented by the output estimated vehicle speed information, automatic travel control section 150 generates a travel schedule including drive travel and coasting. Details of the travel schedule are described later.

Then, on the basis of the present position of vehicle 1, automatic travel control section 150 controls vehicle 1 to travel in accordance with the generated travel schedule.

For example, in the case of drive travel, automatic travel control section 150 controls the fuel injection amount of engine 3 through power transferring ECU 11 and the like so that the vehicle travels at the speed in accordance with the travel schedule. In addition, in the case of coasting, automatic travel control section 150 disengages clutch 4 through power transferring ECU 11. In addition, in the case where the vehicle speed is excessively high, the case where a hindrance is detected in the forward direction, and the like case, automatic travel control section 150 appropriately controls each section of braking device 40 to stop vehicle 1.

Each of engine ECU 10, power transferring ECU 11, travel control device 100 has, for example, a central processing unit (CPU), a storage medium such as a read-only memory (ROM) having a control program stored therein, a working memory such as a random access memory (RAM), and a communication circuit, although these components are not illustrated. In this case, for example, the functions of the above-mentioned sections of travel control device 100 are achieved when the CPU executes the control program. It is to be noted that, engine ECU 10, power transferring ECU 11, and travel control device 100 may be integrally provided in part or in whole.

With travel control device 100, vehicle 1 having the above-mentioned configuration can generate a travel schedule by setting an estimation value of a travel resistance coefficient of vehicle 1 in a switching manner in accordance with the operation state of the wiper, and can control vehicle 1 to travel in accordance with the generated travel schedule.

Details of the travel schedule, the vehicle speed estimation, and the travel resistance information are described below.

(Travel Schedule)

For example, automatic travel control section 150 sequentially generates at constant intervals a travel schedule of a predetermined time length from the present time, or, a travel schedule of a predetermined travel distance from the present position of vehicle 1. For example, such travel schedules are generated such that the travel schedule satisfies a travel condition that the average moving vehicle speed is target-vehicle speed V', and the maximum vehicle speed of the coasting is $V_{max}'=V'+vb$ or smaller, and, the minimum vehicle speed of the coasting is $V_{min}'=V'-va$ or greater.

For example, automatic travel control section 150 generates a travel schedule for actively performing coasting on a downslope road on the basis of the road information. Further, on the condition that the vehicle speed is acceptable minimum vehicle speed $V_{min}'$ or greater at the crest where the road changes from an upslope to a downslope, automatic travel control section 150 generates a travel schedule including switching from the drive travel to the coasting at a position before the crest.

Figures 3, 4:
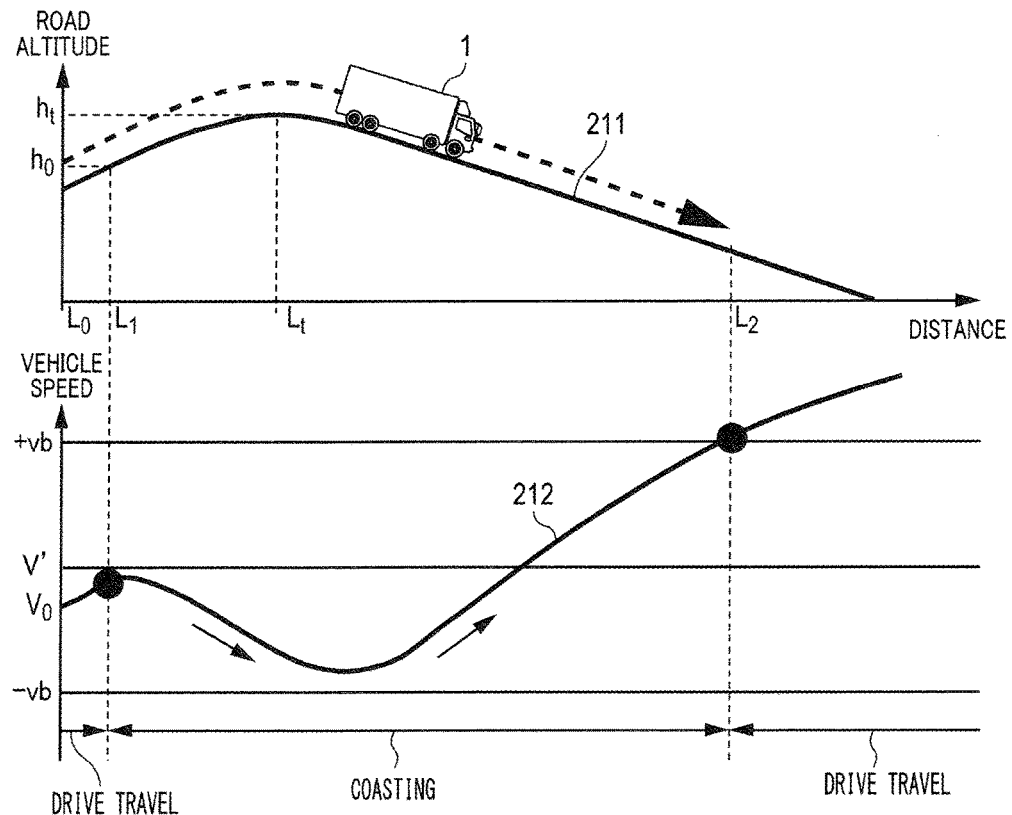
FIG. 3 illustrates examples of road grade information and a travel schedule of the present embodiment.
FIG. 4 illustrates an example of a content of travel resistance information of the present embodiment.

FIG. 3 illustrates examples of the road grade information and the travel schedule.

For example, the road grade information includes information representing the road altitude corresponding to the horizontal distance (road distance) from present position $L_0$ of vehicle 1 as upper solid line 211 indicates in of FIG. 3. It is to be noted that the horizontal distance from present position $L_0$ of vehicle 1 may be replaced by the elapsed time from the present time. In addition, the road altitude may be replaced by the road grade, from the relationship with the preceding and succeeding road altitude. The road grade information of solid line 211 indicates that present position $L_0$ of vehicle 1 is in the middle of an upslope and that there is a downslope immediately after the upslope.

For example, automatic travel control section 150 sequentially determines whether a part (hill crest) where the road changes from an upslope to a downslope is present within a predetermined distance range of the road ahead on the basis of the road grade information.

Then, when there is a hill crest, automatic travel control section 150 determines whether the vehicle can travel through the hill crest by coasting in the case where switching to coasting is performed at position $L_1$ immediately after present position $L_0$. That is, automatic travel control section 150 calculates whether the vehicle speed at the hill crest is acceptable minimum vehicle speed $V_{min}'$ or greater. Automatic travel control section 150 performs the above-mentioned calculation based on current vehicle speed $v_0$, the travel resistance coefficient of vehicle 1 determined in advance by the experiment and the like, and the road grade information.

When switching to coasting is performed at an upslope, the vehicle speed is abruptly reduced. However, in the case where the speed is high or the case where the distance to the crest is short enough to maintain the vehicle speed at acceptable minimum vehicle speed $V_{min}'(V'-va)$ or greater at a position near a downslope, the above-mentioned travel condition that the minimum vehicle speed of coasting is acceptable minimum vehicle speed $V_{min}'$ or greater can be satisfied even when switching to coasting is performed at an upslope.

When automatic travel control section 150 determines that the vehicle can pass through the hill crest by coasting, automatic travel control section 150 determines that switching to coasting is performed at next point $L_1$, and that the coasting is maintained until the vehicle reaches point $L_2$ where the vehicle speed falls outside the range of $V_{min}{}'$ to $V_{max}{}'$ (V'−va to V'+vb), for example. Then, as lower solid line 212 indicates in FIG. 3, automatic travel control section 150 generates a travel schedule in which switching to coasting is performed at point $L_1$ and the coasting is maintained until the vehicle reaches point $L_2$.

Such a travel schedule including a coasting section determined based on the road grade information effectively improves the fuel economy of vehicle 1. In addition, with the control of vehicle 1 to travel in accordance with the travel schedule, the driver's successive accelerator operation is unnecessary. In the following description, the automatic travel in accordance with a travel schedule including drive travel and coasting which is generated based on the road grade information is referred to as "eco-map cruise travel."

(Method of Estimating Vehicle Speed)

In the following description, $h_0$ represents the altitude of present position $L_0$ of vehicle 1, $h_t$ the altitude of crest position $L_t$, $\Delta x$ the distance (road distance) in the horizontal direction from present position $L_0$ to crest position $L_t$, and $\theta_0$ the average value (hereinafter referred to as "average road grade") of the road grade from present position $L_0$ to crest position $L_t$. In addition, M represents the present vehicle weight of vehicle 1, g the gravitational acceleration, μ the roll resistance coefficient of vehicle 1, and λ the air resistance coefficient of vehicle 1.

Expression (1) expresses $v_t$ which is the estimation value of the vehicle speed at crest position $L_t$ in the case where vehicle 1 performs coasting up to crest position $L_t$ (hereinafter referred to as "estimation crest vehicle speed"), for example.

[Expression 1]

$$v_t = \sqrt{\frac{2}{M}\left\{\frac{1}{2}Mv_0^2 + Mgh_0 - \left(Mgh_t + F_a \cdot \frac{\Delta x}{\cos\theta_0} + F_r \cdot \frac{\Delta x}{\cos\theta_0}\right)\right\}} \quad (1)$$

Here, $F_a$ represents the average air resistance force which is exerted on vehicle 1 during the travel from present position $L_0$ to crest position $L_t$. $F_a$ is expressed by Expression (2), for example. In addition, $F_r$ represents the average roll resistance force which is exerted on vehicle 1 from present position $L_0$ to crest position $L_t$, and is expressed by Expression (3), for example. It is to be noted that, u represents the roll resistance coefficient.

[Expression 2]

$$F_a = \lambda \cdot v_D^2 \cdot g \quad (2)$$

[Expression 3]

$$F_r = \mu \cdot Mg \cdot \cos\theta_0 \quad (3)$$

In this case, estimation crest vehicle speed $v_t$ is expressed by Expression (4) based on Expressions (1), (2) and (3).

[Expression 4]

$$v_t = \sqrt{\frac{2}{M}\left\{\frac{1}{2}Mv_0^2 + Mgh_0 - \left(Mgh_t + \lambda \cdot v_0^2 \cdot g \cdot \frac{\Delta x}{\cos\theta_0} + \mu \cdot Mg \cdot \Delta x\right)\right\}} \quad (4)$$

For example, coasting estimation section 140 acquires altitude $h_0$, altitude $h_t$, and distance (road distance) $\Delta x$ from road information, and further calculates average road grade $\theta_0$. In addition, coasting estimation section 140 acquires vehicle speed $v_0$ and vehicle weight M from vehicle information. Then, coasting estimation section 140 calculates estimation crest vehicle speed $v_t$ by use of Expression (4) based on roll resistance coefficient μ and gravitational acceleration g set in advance, and the above-mentioned parameters.

Then, when the calculated estimation crest vehicle speed $v_t$ is equal to or greater than the set acceptable minimum vehicle speed $V_{min}{}'$, automatic travel control section 150 determines that the coasting is maintained, whereas drive travel is switched to coasting. That is, automatic travel control section 150 generates a travel schedule indicated by solid line 212 in FIG. 3 for example, and controls vehicle 1 in accordance with the schedule.

For example, roll resistance coefficient μ of a non-rainfall condition can be estimated with high accuracy by measuring the actual travel of vehicle 1 on the road of an average road surface state under a non-rainfall condition and by performing an inverse operation by use of Expression (4) from the result of the measurement. In addition, by use of the roll resistance coefficient μ obtained in the above-mentioned manner, it is possible to accurately estimate estimation crest vehicle speed $v_t$ for a road under a non-rainfall condition.

On the other hand, the vehicle speed at crest position $L_t$ on the road under a rainfall condition is lower than estimation crest vehicle speed $v_t$ which is calculated based on roll resistance coefficient μ obtained from the value measured under a non-rainfall condition. As a result, the effect of improvement in fuel economy is degraded as described above.

For example, in the case where the vehicle passes through crest position $L_t$ by coasting, automatic travel control section 150 determines that the timing of starting coasting is a timing earlier than the appropriate timing, and consequently, performs switching to drive travel before crest position $L_t$.

Accordingly, coasting estimation section 140 (or estimation value switching section 120) holds or acquires, as travel resistance information, not only the roll resistance coefficient obtained from the value measured under a non-rainfall condition, but also the roll resistance coefficient μ' obtained from the value measured under a rainfall condition. Then, on the basis of whether the road is under a rainfall condition, estimation value switching section 120 appropriately make a request for switching of the travel resistance coefficient to coasting estimation section 140. As a result, coasting estimation section 140 can appropriately use roll resistance coefficients μ and μ' to estimate estimation crest vehicle speed $v_t$. Then automatic travel control section 150 suitably determines the timing of starting coasting, for example.

(Travel Resistance Information)

FIG. 4 illustrates an example of the travel resistance information.

As illustrated in FIG. 4, travel resistance information 220 describes roll resistance coefficient 222 for each operation state of the wiper (hereinafter referred to as "wiper state") 221.

For example, roll resistance coefficient 222 of $\mu_0$ is described in association with wiper state 221 corresponding to a stopped state. This is an estimation value of the travel resistance coefficient of the case where vehicle 1 performs coasting on the road under a non-rainfall condition.

In addition, roll resistance coefficients 222 of $\mu_1$ to $\mu_3$ are described in association with respective operation levels (operation intervals) of wiper state 221 corresponding to the operating state. These are estimation values of the travel resistance coefficients of the case where vehicle 1 performs coasting on the road under a rainfall condition.

Desirably, the wiper information indicates the operation level as well as the information whether the wiper is in operation in the case where different roll resistance coefficients 222 are defined for a plurality of wiper states 221 in the above-mentioned manner. In this case, estimation value switching section 120 operates such that coasting estimation section 140 uses roll resistance coefficient 222 corresponding to the operation level represented by the wiper information, for example.

It is to be noted that, roll resistances coefficient 222 of the case where the wiper is in operation can also be represented by correction coefficients $\alpha_1$ to $\alpha_3$ with respect to roll resistance coefficient $\mu_0$ of the case where the wiper is stopped. Accordingly, travel resistance information 220 may describe only roll resistance coefficient $\mu_0$ and correction coefficients $\alpha_1$ to $\alpha_3$, for example.

(Operation of Device)

Next, an operation of travel control device 100 is described.

Figure 5:
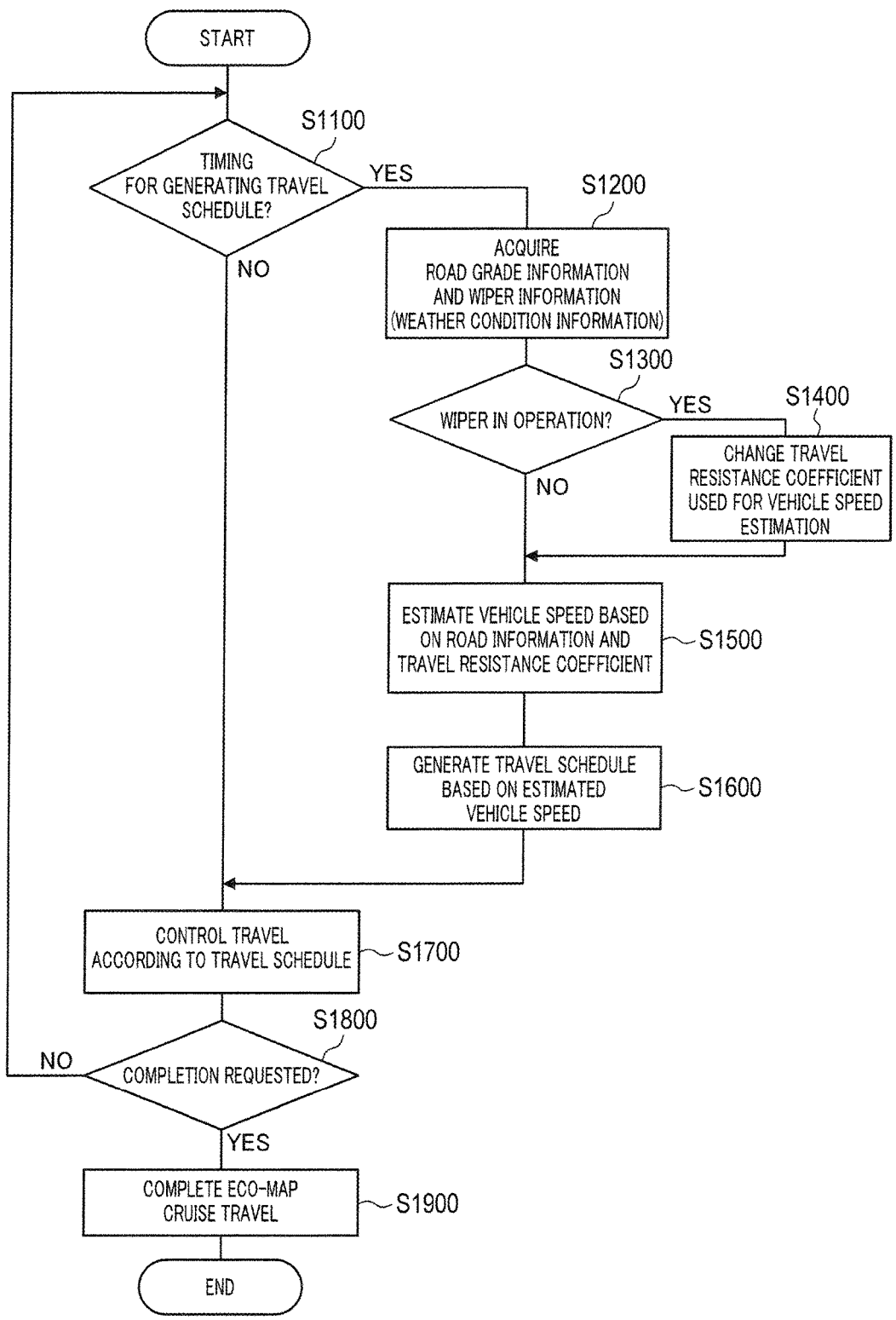
FIG. 5 is a flowchart of an example operation of the travel control device according to the present embodiment.

FIG. 5 is a flowchart of an example operation of travel control device 100.

At step S1100, automatic travel control section 150 determines whether the timing for generating a travel schedule has come. The above-mentioned timing is a timing for starting travel, which subsequently comes at a predetermined interval (of 200 m travel, or the like).

When the timing for generating a travel schedule has come (S1100: YES), automatic travel control section 150 advances the process to step S1200. In addition, when the timing for generating a travel schedule has not come (S1100: NO), automatic travel control section 150 advances the process to step S1700 described later.

At step S1200, road information acquiring section 130 acquires road information, and weather condition information acquiring section 110 acquires wiper information (weather condition information).

At step S1300, estimation value switching section 120 determines whether the wiper is in operation on the basis of the acquired wiper information. When the wiper is in operation (S1300: YES), estimation value switching section 120 advances the process to step S1400. In addition, when the wiper is in a stopped state (S1300: NO), estimation value switching section 120 advances the process to step S1500 described later.

At step S1400, estimation value switching section 120 determines that the travel resistance coefficient which is used for vehicle speed estimation is to be changed to the roll resistance coefficient obtained from the value measured under a rainfall condition (hereinafter referred to as "rainfall condition roll resistance coefficient"), and sends a request to coasting estimation section 140.

At step S1500, coasting estimation section 140 performs vehicle speed estimation on the basis of the road information and the travel resistance coefficient (roll resistance coefficient).

It is to be noted that, in the initial state, coasting estimation section 140 performs vehicle speed estimation by use of the roll resistance coefficient obtained from the value measured under a non-rainfall condition (hereinafter referred to as "reference roll resistance coefficient"). It should be noted that when it is determined that the travel resistance coefficient is to be changed to the rainfall condition roll resistance coefficient at step S1400, coasting estimation section 140 uses the rainfall condition roll resistance coefficient. It is to be noted that, when use of the rainfall condition roll resistance coefficient is once requested, coasting estimation section 140 may continue the use of the rainfall condition roll resistance coefficient for a certain period (of 30 minutes, or the like).

For example, coasting estimation section 140 estimates the vehicle speed at each point ahead of vehicle 1 in the case where coasting is started from the present position (or a position immediately after the present position).

At step S1600, automatic travel control section 150 generates a travel schedule actively including coasting on the basis of the estimated vehicle speed. Automatic travel control section 150 determines that switching from drive travel to coasting is to be performed in the case where it is estimated that the vehicle passes through the crest position of an uphill at a vehicle speed equal to or greater than acceptable minimum vehicle speed $V_{min}$' when coasting is started from the present position (or a position immediately after the present position).

At step S1700, automatic travel control section 150 controls the travel of vehicle 1 in accordance with the generated travel schedule. That is, automatic travel control section 150 performs eco-map cruise travel.

At step S1800, automatic travel control section 150 determines whether completion of the eco-map cruise travel is requested by the driver's operation and the like. When completion of the eco-map cruise travel is not requested (S1800: NO), automatic travel control section 150 returns the process back to step S1100. When completion of the eco-map cruise travel is requested (S1800: YES), automatic travel control section 150 advances the process to step S1900.

Then, at step S1900, automatic travel control section 150 completes the eco-map cruise travel.

Through the above-mentioned operation, travel control device 100 can achieve eco-map cruise travel while performing vehicle speed estimation using a travel resistance coefficient of an appropriate value, and generating a suitable travel schedule of vehicle 1.

Effect of Present Embodiment

As described above, travel control device 100 according to the present embodiment acquires weather condition information representing the weather condition of the road on which vehicle 1 travels, variably sets an estimation value of the travel resistance force in accordance with the acquired weather condition information, and estimates the vehicle speed variation on the basis of the set estimation value of the travel resistance force. Then, travel control device 100 according to the present embodiment generates a travel schedule of vehicle 1 including drive travel and coasting on the basis of the estimated variation of the vehicle speed, and controls vehicle 1 to travel in accordance with the generated travel schedule.

With this configuration, travel control device 100 according to the present embodiment can further improve the fuel economy of vehicle 1 in comparison with the conventional technique in which the travel resistance coefficient is fixed.

In addition, travel control device 100 according to the present embodiment acquires wiper information representing the operation state of the wiper of vehicle 1, and, on the basis of the wiper information, performs the vehicle speed estimation by use of the travel resistance coefficient for the non-rainfall condition and the travel resistance coefficient for the rainfall condition in a switching manner.

With this configuration, travel control device 100 according to the present embodiment can select the travel resistance coefficients in accordance with whether the road is under a rainfall condition while utilizing the existing devices of vehicle 1. That is, it is possible to further improve the fuel economy of vehicle 1 at low cost without additionally providing components such as communication devices and sensors for acquiring weather condition information.

Modification of Present Embodiment

It is to be noted that the content of the travel schedule, the generation of the travel schedule and the information (the setting information, the road information, and the vehicle information) used for the automatic travel are not limited to the above-described examples.

For example, the travel schedule may have a content which does not require the road grade information in which switching to drive travel is performed at a time point when the vehicle speed is reduced to V'−va, and switching to coasting is performed at a time point when the vehicle speed reaches V'+vb.

In addition, coasting estimation section 140 may perform the vehicle speed estimation without disregarding the air resistance force. In this case, coasting estimation section 140 (or estimation value switching section 120) needs to store or acquire a plurality of values corresponding to different weather conditions as the values used for the air resistance coefficient. Then, estimation value switching section 120 needs to control coasting estimation section 140 to switch the plurality of values of the air resistance coefficient which is used for the vehicle speed estimation in accordance with the weather condition information.

In addition, estimation value switching section 120 may switch the travel resistance coefficients for the vehicle speed estimation based on other weather conditions having an influence on the travel resistance force other than the condition that the weather condition is the rainfall condition. For example, as the weather conditions, estimation value switching section 120 may switch the travel resistance coefficients on the basis of whether rain has fallen in a predetermined time in the past (that is, whether the road surface is wet), whether snow is fallen, whether snow has fallen, and whether the intensity of the opposing wind is greater than a predetermined level.

In this case, weather condition information acquiring section 110 needs to acquire, as the weather condition information, the information representing the weather condition used for determination of estimation value switching section 120. In addition, coasting estimation section 140 (or estimation value switching section 120) needs to store or externally acquire a plurality of travel resistance coefficients corresponding to the weather conditions which are used for the determination of estimation value switching section 120.

In addition, estimation value switching section 120 may variably set the estimation value of the travel resistance force to be exerted on vehicle 1 traveling on the road by methods other than the method of setting the travel resistance coefficient. For example, in the case where the travel resistance forces of weather conditions are respectively determined in advance for combinations of vehicle weight M and average road grade $\theta_0$, estimation value switching section 120 may set the estimation value of the corresponding travel resistance force.

In addition, a part of the configuration of travel control device 100 may be physically separated from other parts of travel control device 100. In this case, each part needs to include a communication circuit for communication.

Outline of Disclosure

A travel control device of the present disclosure includes: a weather condition information acquiring section that acquires weather condition information representing a weather condition of a road on which a vehicle travels; an estimation value switching section that variably sets an estimation value of a travel resistance force to be exerted on the vehicle traveling on the road in accordance with the acquired weather condition information; a coasting estimation section that estimates a variation of a vehicle speed of the vehicle on the road based on the set estimation value of the travel resistance force; and an automatic travel control section that generates a travel schedule of the vehicle including drive travel and coasting based on the estimated variation of the vehicle speed, and controls the vehicle to travel in accordance with the generated travel schedule.

Preferably, in the travel control device, the estimation value switching section sets an estimation value of a travel resistance coefficient of the travel resistance force to set the estimation value of the travel resistance force; when the weather condition represented by the weather condition information is a first weather condition, the estimation value switching section sets a first travel resistance coefficient that is an estimation value of the travel resistance coefficient for a case where the vehicle travels on the road under the first weather condition; and when the weather condition represented by the weather condition information is a second weather condition, the estimation value switching section sets a second travel resistance coefficient that is an estimation value of the travel resistance coefficient for a case where the vehicle travels on the road under the second weather condition.

Preferably, in the travel control device, the first weather condition is a non-rainfall condition; the second weather condition is a rainfall condition; and the weather condition information indicates whether the road is under the rainfall condition.

Preferably, in the travel control device, the weather condition information acquiring section acquires wiper information representing an operation state of a wiper of the vehicle as the weather condition information.

Preferably, the travel control device further includes a road information acquiring section that acquires road grade information representing a road grade of the road. The coasting estimation section estimates the variation of the vehicle speed based on the road grade represented by the acquired road grade information; and the automatic travel control section generates the travel schedule based on the road grade represented by the acquired road grade information.

Preferably, in the travel control device, the second travel resistance coefficient is higher than the first travel resistance coefficient; and the travel schedule includes a content in which, on the condition that the vehicle speed is a predetermined value or greater at a crest where the road changes from an upslope to a downslope, drive travel is changed to coasting at a position before the crest.

A travel controlling method of the present disclosure includes: acquiring weather condition information representing a weather condition of a road on which a vehicle travels; variably setting an estimation value of a travel resistance force to be exerted on the vehicle traveling on the road in accordance with the acquired weather condition information; estimating a variation of a vehicle speed of the vehicle on the road based on the set estimation value of the travel resistance force; and generating a travel schedule of the vehicle including drive travel and coasting based on the estimated variation of the vehicle speed, and controlling the vehicle to travel in accordance with the generated travel schedule.

This application is entitled to and claims the benefit of Japanese Patent Application No. 2015-065566 dated Mar. 27, 2015, the disclosure of which including the specification, drawings and abstract is incorporated herein by reference in its entirety.

INDUSTRIAL APPLICABILITY

The travel control device and the travel controlling method of the present disclosure are useful as a travel control device and a travel controlling method which can further improve the fuel economy of a vehicle.

REFERENCE SIGNS LIST

1 Vehicle
2 Automatic traveling device
3 Engine
4 Clutch
5 Transmission
6 Propeller shaft
7 Differential gear
8 Drive shaft
9 Wheel
10 Engine ECU
11 Power transferring ECU
13 Target-vehicle speed setting device
14 Increment/reduction value setting device
20 Road information acquiring device
21 Present position acquiring device
22 Weather condition acquiring device
23 Periphery sensor
30 Vehicle information acquiring device
31 Accelerator sensor
32 Brake switch
33 Shift lever
34 Turn-signal switch
35 Vehicle speed sensor
40 Braking device
41 Foot brake
42 Retarder
43 Auxiliary brake
100 Travel control device
110 Weather condition information acquiring section
120 Estimation value switching section
130 Road information acquiring section
140 Coasting estimation section
150 Automatic travel control section

The invention claimed is:
1. A travel control device comprising:
a weather condition information acquiring section that acquires weather condition information representing a weather condition of a road on which a vehicle travels;
an estimation value switching section that variably sets an estimation value of a travel resistance force to be exerted on the vehicle traveling on the road in accordance with the acquired weather condition information;
a coasting estimation section that estimates a variation of a vehicle speed of the vehicle on the road based on the set estimation value of the travel resistance force; and
an automatic travel control section that generates a travel schedule of the vehicle including drive travel and coasting based on the estimated variation of the vehicle speed, and controls the vehicle to travel in accordance with the generated travel schedule, wherein:
the estimation value switching section sets an estimation value of a travel resistance coefficient of the travel resistance force to set the estimation value of the travel resistance force;
when the weather condition represented by the weather condition information is a first weather condition, the estimation value switching section sets a first travel resistance coefficient that is an estimation value of the travel resistance coefficient for a case where the vehicle travels on the road under the first weather condition; and
when the weather condition represented by the weather condition information is a second weather condition, the estimation value switching section sets a second travel resistance coefficient that is an estimation value of the travel resistance coefficient for a case where the vehicle travels on the road under the second weather condition.

2. The travel control device according to claim 1, wherein:
the first weather condition is a non-rainfall condition;
the second weather condition is a rainfall condition; and
the weather condition information indicates whether the road is under the rainfall condition.

3. The travel control device according to claim 2, wherein the weather condition information acquiring section acquires wiper information representing an operation state of a wiper of the vehicle as the weather condition information.

4. The travel control device according to claim 1 further comprising a road information acquiring section that acquires road grade information representing a road grade of the road, wherein:
the coasting estimation section estimates the variation of the vehicle speed based on the road grade represented by the acquired road grade information; and
the automatic travel control section generates the travel schedule based on the road grade represented by the acquired road grade information.

5. The travel control device according to claim 4, wherein:
the second travel resistance coefficient is higher than the first travel resistance coefficient; and
the travel schedule includes a content in which, on a condition that the vehicle speed is a predetermined value or greater at a crest where the road changes from an upslope to a downslope, drive travel is changed to coasting at a position before the crest.

6. A travel controlling method comprising:
acquiring weather condition information representing a weather condition of a road on which a vehicle travels;

variably setting an estimation value of a travel resistance force to be exerted on the vehicle traveling on the road in accordance with the acquired weather condition information;

estimating a variation of a vehicle speed of the vehicle on the road based on the set estimation value of the travel resistance force; and generating a travel schedule of the vehicle including drive travel and coasting based on the estimated variation of the vehicle speed, and controlling the vehicle to travel in accordance with the generated travel schedule, wherein in the variably setting of an estimation value of a travel resistance force:

the estimation value of the travel resistance force is set by setting an estimation value of a travel resistance coefficient of the travel resistance force;

when the weather condition represented by the weather condition information is a first weather condition, a first travel resistance coefficient is set, the first travel resistance coefficient being an estimation value of the travel resistance coefficient for a case where the vehicle travels on the road under the first weather condition; and when the weather condition represented by the weather condition information is a second weather condition, a second travel resistance coefficient is set, the second travel resistance coefficient being an estimation value of the travel resistance coefficient for a case where the vehicle travels on the road under the second weather condition.

7. The travel control device according to claim 1, wherein:

the weather condition information acquiring section acquires an operation level of a wiper of the vehicle; and the estimation value switching section sets the estimation value based on the acquired operation level.

* * * * *